US008630952B2

(12) United States Patent
Menon

(10) Patent No.: US 8,630,952 B2
(45) Date of Patent: Jan. 14, 2014

(54) METHODS AND SYSTEMS USING CONTACTLESS CARD

(75) Inventor: Satish Mukunda Menon, Singapore (SG)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 13/346,045

(22) Filed: Jan. 9, 2012
(Under 37 CFR 1.47)

(65) Prior Publication Data
US 2012/0265682 A1  Oct. 18, 2012

Related U.S. Application Data

(66) Substitute for application No. 61/449,164, filed on Mar. 4, 2011.

(51) Int. Cl.
*G06Q 40/00* (2012.01)
(52) U.S. Cl.
USPC .......................................................... 705/44
(58) Field of Classification Search
None
See application file for complete search history.

(56) References Cited

U.S. PATENT DOCUMENTS

| | | | | |
|---|---|---|---|---|
| 7,213,000 B2 * | 5/2007 | Gutierrez et al. | ............... | 705/37 |
| 7,264,154 B2 * | 9/2007 | Harris | ........................... | 235/380 |
| 7,593,896 B1 * | 9/2009 | Flitcroft et al. | ................. | 705/39 |
| 2006/0231611 A1 * | 10/2006 | Chakiris et al. | ............... | 235/380 |
| 2007/0200684 A1 * | 8/2007 | Colby | ........................ | 340/10.51 |
| 2008/0081600 A1 * | 4/2008 | Choi | ............................. | 455/418 |
| 2009/0134217 A1 * | 5/2009 | Flitcroft et al. | ............... | 235/380 |
| 2010/0081374 A1 * | 4/2010 | Moosavi | ....................... | 455/41.1 |
| 2010/0312700 A1 * | 12/2010 | Coulter et al. | .................. | 705/42 |
| 2011/0060684 A1 * | 3/2011 | Jucht et al. | ...................... | 705/42 |
| 2011/0213707 A1 * | 9/2011 | Jackson et al. | .................. | 705/44 |
| 2012/0078737 A1 * | 3/2012 | Kulakowski | .................... | 705/16 |
| 2013/0204781 A1 * | 8/2013 | Flitcroft et al. | ................. | 705/41 |

FOREIGN PATENT DOCUMENTS

| | | |
|---|---|---|
| WO | WO 2009/014499 | 1/2009 |
| WO | WO 2009/078810 | 6/2009 |

OTHER PUBLICATIONS

Anonymous; Sodexho Links with FreedomPay; Foodservice Director; vol. 15, Iss. 8, p. 24; Aug. 15, 2002.*
Krebsbach, Karen; EZier Cash-Free Transactions: Speeding Up RFID; Bank Technology News; vol. 16, Iss. 7, p. 27; Jul. 2003.*
Reed, Fred; New Chip Raises Fears of the End of Privacy; Washington Times; Jan. 23, 2003.*

* cited by examiner

*Primary Examiner* — Virpi Kanervo
(74) *Attorney, Agent, or Firm* — Eric L. Sophir; Dentons US LLP

(57) ABSTRACT

It is desirable to implement security features that can prevent the unauthorized use of a customer's sensitive account information from an RFID sticker. The methods and systems described herein attempt to resolve the deficiencies with the conventional RFID stickers. In a more secure implementation, a financial institution allows a customer to activate or deactivate the account for use with the RFID sticker by submitting a request to the financial institution using internet banking, mobile banking, SMS texting, or other communications method.

9 Claims, 8 Drawing Sheets

METHODS AND SYSTEMS USING CONTACTLESS CARD

CROSS-REFERENCE TO RELATED APPLICATIONS

This application claims priority to U.S. Provisional Patent Application Ser. No. 61/449,164, entitled "Methods and Systems Using Contactless Card," filed Mar. 4, 2011, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the secure use of an RFID sticker for a financial transaction.

BACKGROUND

Radio frequency identification (RFID) stickers or tags use radio frequency to transmit data to an RFID reader. The RFID sticker can be used for payments at a merchant that has point of sale terminals that accept these contactless devices. The RFID sticker can be affixed to a device, such as a mobile phone. When the customer desires to use the RFID sticker to complete a transaction, the customer brings the RFID sticker within a certain proximity of a point of sale terminal. The point of sale terminal can read the RFID sticker and process the transaction using the payment information supplied by the RFID sticker.

Using RFID stickers can cause security issues with the customer's sensitive account information. A third party can use an RFID reader to obtain account information from an unsuspecting customer having an RFID sticker. The third party with the appropriate RFID reader can possibly obtain this account information by merely passing a customer's RFID sticker while walking on the sidewalk. As a result, it is desirable to implement security features that can prevent the unauthorized use of a customer's account information from an RFID sticker.

SUMMARY

It is desirable to implement security features that can prevent the unauthorized use of a customer's sensitive account information from an RFID sticker, and the methods and systems described herein attempt to resolve the deficiencies with the conventional RFID stickers. In a more secure implementation, a financial institution allows a customer to switch on or off the account for use with the RFID sticker by submitting a request to the financial institution using internet banking, mobile banking, SMS texting, or other communications method. Because an RFID sticker cannot be turned on and off for each use, the customer can communicate with the financial institution to block the account or allow its use during designated time periods.

In one embodiment, a computer-implemented method for more securely using an RFID mechanism in a transaction comprises receiving, by a computer of a financial institution, a first request from a customer to switch on the use an RFID mechanism associated with a credit account of the customer, wherein the first request is submitted via a website of the financial institution, a text message to the financial institution, a mobile banking application of the financial institution, or a phone call to the financial institution; switching on, by a computer of the financial institution, the use of the RFID mechanism associated with the credit account of the customer; receiving, by a computer of the financial institution, a request from a merchant to authorize a transaction with the customer using the RFID mechanism; transmitting, by a computer of the financial institution, an authorization to the merchant for the transaction; receiving, by a computer of a financial institution, a second request from a customer to deactivate the use of the RFID mechanism associated with the credit account of the customer, wherein the second request is submitted via the website of the financial institution, a text message to the financial institution, the mobile banking application of the financial institution, or a phone call to the financial institution; and switching off, by a computer of the financial institution, the use of the RFID mechanism associated with the credit account of the customer.

In another embodiment, a computer-implemented method for more securely using an RFID mechanism in a transaction comprises receiving, by a computer of a financial institution, a request from a customer to switch on the use an RFID mechanism associated with a credit account of the customer, wherein the request is submitted via a website of the financial institution, a text message to the financial institution, a mobile banking application of the financial institution, or a phone call to the financial institution; switching on, by a computer of the financial institution, the use of the RFID mechanism associated with the credit account of the customer; receiving, by a computer of the financial institution, a request from a merchant to authorize a transaction with the customer using the RFID mechanism; transmitting, by a computer of the financial institution, an authorization to the merchant for the transaction; and switching off, by a computer of the financial institution, the use of the RFID mechanism associated with the credit account of the customer after the transaction with the merchant.

In yet another embodiment, a computer-implemented method for conducting a transaction comprises receiving, by a computer of a financial institution, a first request from a customer using a first communication channel to activate the use of a payment mechanism associated with an account of the customer; activating, by a computer of the financial institution, the account of the customer; receiving, by a computer of the financial institution, a request from a point of sale to authorize a transaction with the customer using the payment mechanism; transmitting, by a computer of the financial institution, authorization for the transaction to the point of sale; and deactivating, by a computer of the financial institution, the account of the customer after the transaction.

In still yet another embodiment, a computer-implemented method for authorizing a transaction comprises receiving, by a computer, a request to authorize a transaction; determining, by the computer, whether the transaction was initiated by an RFID sticker; determining, by the computer, whether the account has been switched on or off for use of the RFID sticker; authorizing the transaction if the request was not initiated by the RFID sticker or the requested was initiated by the RFID sticker and the account has been switched on; and declining the transaction if the request was initiated by the RFID sticker and the account has been switched off.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The methods and systems described herein attempt to resolve the deficiencies with the conventional RFID stickers. In a more secure implementation, a credit card member can perform credit card transactions by placing the RFID sticker in close proximity to a contactless reader at a point of sale. By affixing the RFID sticker to a mobile phone, a financial institution can offer mobile couponing, store coupons on the mobile phone thereby reducing lost coupons, personalized rewards, and encourages customer loyalty and retention. Besides credit card payments, the RFID sticker can also be used with mobile coupons that are sent to the customer's card account. The mobile coupons can be sent to the financial institution's customers who make credit card transactions with selected merchants. The coupons can enable customers to enjoy discounts with selected merchants that allow payments using contactless devices a the point of sale. Customers can log on to a web site at the financial institution or another web address to view available coupons. Also, although the methods and systems described herein use an RFID sticker, it is intended that any contactless technology can be used.

Figure 1:
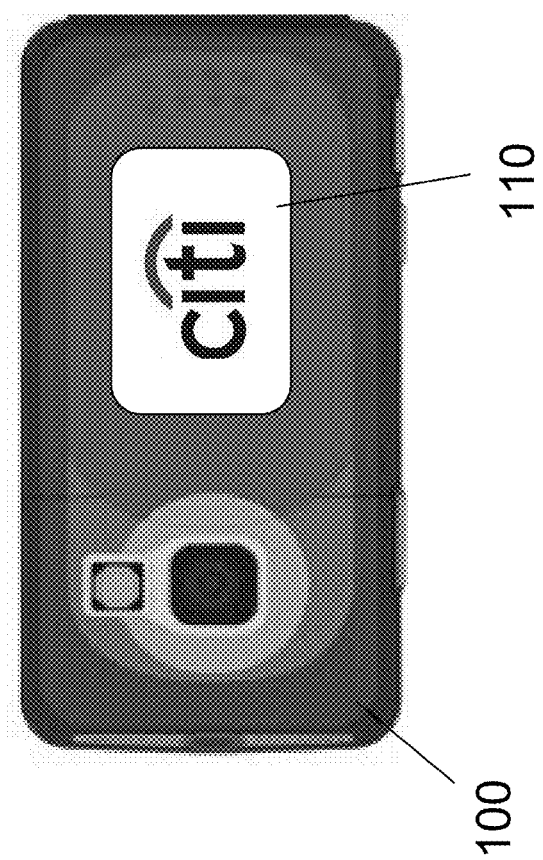
FIG. 1 shows a mobile phone with an RFID sticker according to an exemplary embodiment.

Referring to FIG. 1, a mobile phone 100 is shown with an RFID sticker 110 affixed to a rear surface of the mobile phone 100, though the RFID sticker 110 can be affixed to any exterior or interior surface of the mobile phone 100. Although this exemplary embodiment depicts the RFID sticker affixed to a mobile phone, it is intended that the RFID sticker can be affixed to any object, such as a wallet, key chain, or other device. Alternatively, the RFID sticker can take the form of a tag and either be secured to another object, such as a key chain, or be used as a standalone item. Also, although the exemplary embodiment discusses the affixation of the RFID sticker to the mobile phone, it is intended that the RFID sticker can be attached or coupled to the mobile phone using means other than adhesive, such as integrating the RFID sticker into a plastic, metal, or glass component; attaching the RFID sticker using screws, rivets, thread, or hook-and-loop fastening; or inserting the RFID sticker into a sleeve of the mobile phone or a case for a mobile phone.

The RFID sticker 110 can include an antenna, an integrated circuit having a processor, and in some instances may include a battery. The processor can be EMV-DDA (Europay, MasterCard, VISA—Dynamic Data Authentication) enabled, so it can dynamically authenticate data whenever a payment request is made. The processor may support an RSA key pair for each RFID sticker, whereby the RFID sticker generates and transmits a dynamic signature that is verified by a point of sale terminal. The RFID sticker may include near field communication (NFC) technology. Additionally, although the exemplary embodiment describes the use of RFID, it is intended that the methods and systems described herein can be applied to the switching on and off of accounts associated with other payment mechanisms, including but not limited to payments using mobile devices, telephones, credit cards, smart cards, key fobs, various financial accounts, checks, and online payments. Each type of payment mechanism may include additional or alternative security measures, but each payment can implement the use of an account that is switched on or off based upon a customer's actions. For example, a mobile payment using a mobile device may require a customer to switch on the mobile payment feature, and the security may also include the use of a dynamically-generated PIN for each transaction.

Figure 2:
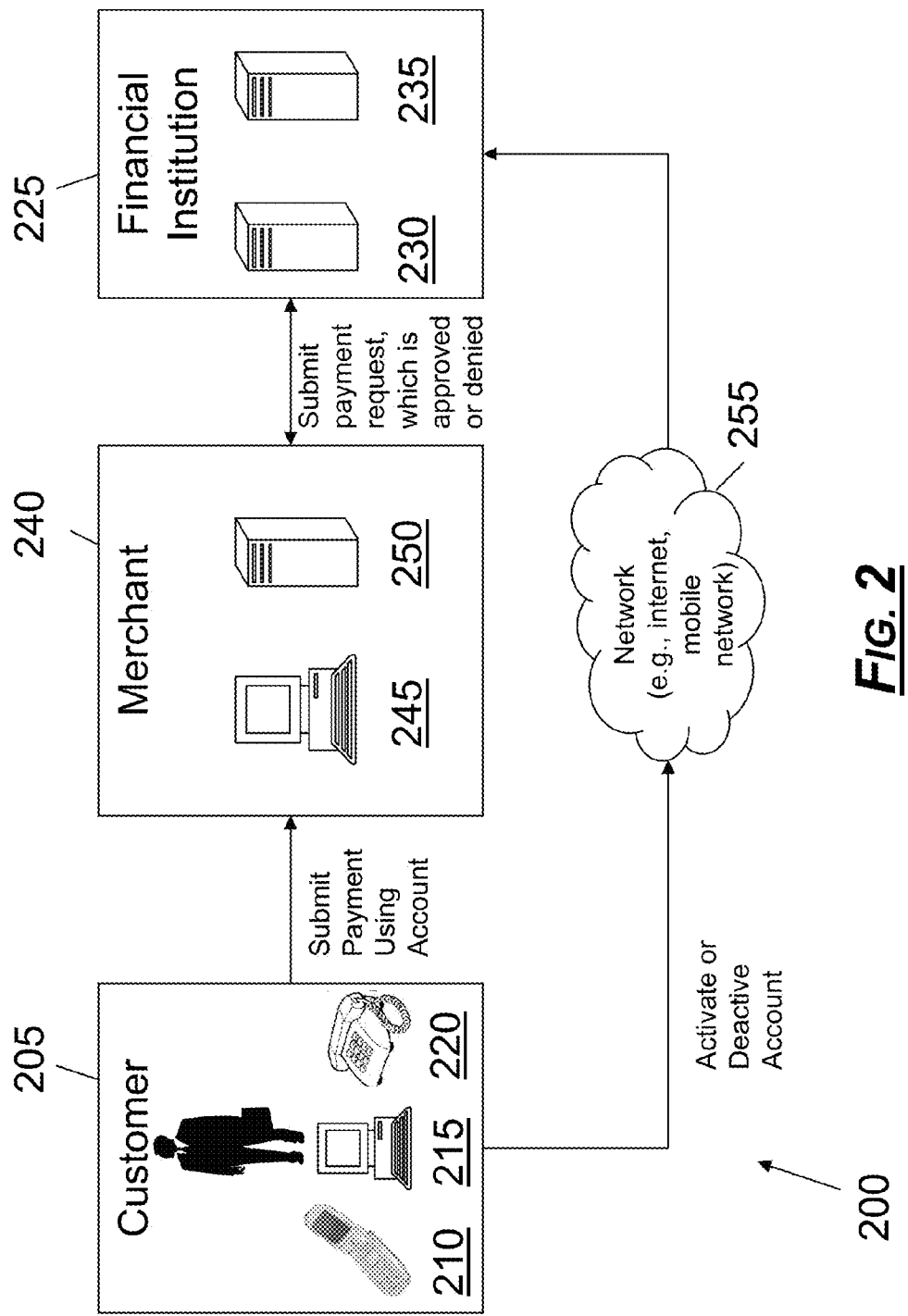
FIG. 2 shows an exemplary system architecture according to an exemplary embodiment.

Referring to FIG. 2, an exemplary system architecture 200 is shown. A customer 205 has an RFID sticker, which can be affixed to a mobile phone 210. The RFID sticker was issued to the customer by a financial institution 225, which holds an account for the customer that can be used in conjunction with the RFID sticker. The account can be a credit account, debit account, charge card account, gift card account, prepaid account, or any other account type.

The customer 205 desires to conduct a transaction at a merchant 240 to purchase goods or services. In a conventional manner, the customer would use an RFID sticker at a point of sale terminal of the merchant, whereby the RFID sticker is always in an "on" or active state and can be brought into proximity of the point of sale terminal to make a purchase. In the methods and systems described herein, however, the RFID sticker itself cannot be turned off, but the financial institution 225 blocks the use of the account associated with the RFID sticker. In the exemplary embodiment, an "off" or deactivated account remains available for use by the customer using payment mechanisms (e.g., online payments, telephone payments, use of a plastic credit card) other than the RFID sticker. In an alternative embodiment, an off account cannot be used by the customer with any payment mechanism.

In order to use the RFID sticker, the customer 205 uses the mobile phone 210, computer 215, telephone 220, or other device to transmit a message over a network 255 to the financial institution 225. The message can request that the financial institution 225 switch on (or activate or unblock) the account for use with an RFID sticker, or the message can request that the financial institution 225 switch off (or deactivate or block) the account to prevent use with the RFID sticker. The financial institution 225 can receive requests sent over the network 255 by a communication server 230, such as a web server. The communication server 230 can provide this request to an account status server 235 that implements the request of the customer 205. Once the financial institution 225 implements the request to deactivate the account, the request of the merchant 240 for authorization by financial institution 225 will be declined. Once the financial institution 225 implements the request to switch on the account, the request of the merchant 240 for authorization by financial institution 225 will be approved, assuming there are sufficient funds and other security and financial criteria are satisfied.

If the customer 205 desires to make a purchase at merchant 225, the customer 205 sends the request to the financial institution 225 to activate the account. The customer 205 approaches a point of sale terminal 245 at the merchant 240 to conduct the transaction. The customer 205 waves, swipes, or otherwise directs the RFID sticker in the vicinity of or close proximity to the point of sale terminal 245. The point of sale terminal 245 receives account information from the RFID sticker, such account number, expiration date, and the name of the customer. The point of sale terminal 245 communicates this account information with other transaction information, such as the transaction amount, to a merchant server 250. The point of sale terminal 245 can also include an indicator, such as one or more alphanumeric characters in a transaction field, that indicates that the transaction was initiated by an RFID sticker. In one embodiment, the RFID sticker can transmit to the point of sale terminal 245 information to indicate that the account information is being transmitted from an RFID sticker. In another embodiment, the point of sale terminal 245 can recognize that it received account information from an RFID sticker and appropriately include the indicator. Conventional credit card transactions where a card is swiped or dipped in a card reader do not include this indicator. The merchant server 250 transmits the account information and transaction information to the financial institution 225 for authorization of the transaction.

The financial institution 225 can receive the authorization request at the communication server 230. The communication server 230 will confirm with the account status server 235 whether the account is switched on for use in an RFID transaction. The financial institution 225 may also determine whether there are sufficient funds available, a sufficient credit line available, or consider other factors in authorizing the transaction. But if the account has been switched off and the request was initiated from an RFID sticker, then the financial institution 225 will not authorize the transaction from the merchant. The financial institution 225 will transmit a message to the merchant server 250 declining the authorization for the transaction. If the account is activated, then the financial institution can transmit an authorization approval to the merchant server 250, as long as other authorization criteria have been satisfied.

Figure 3:
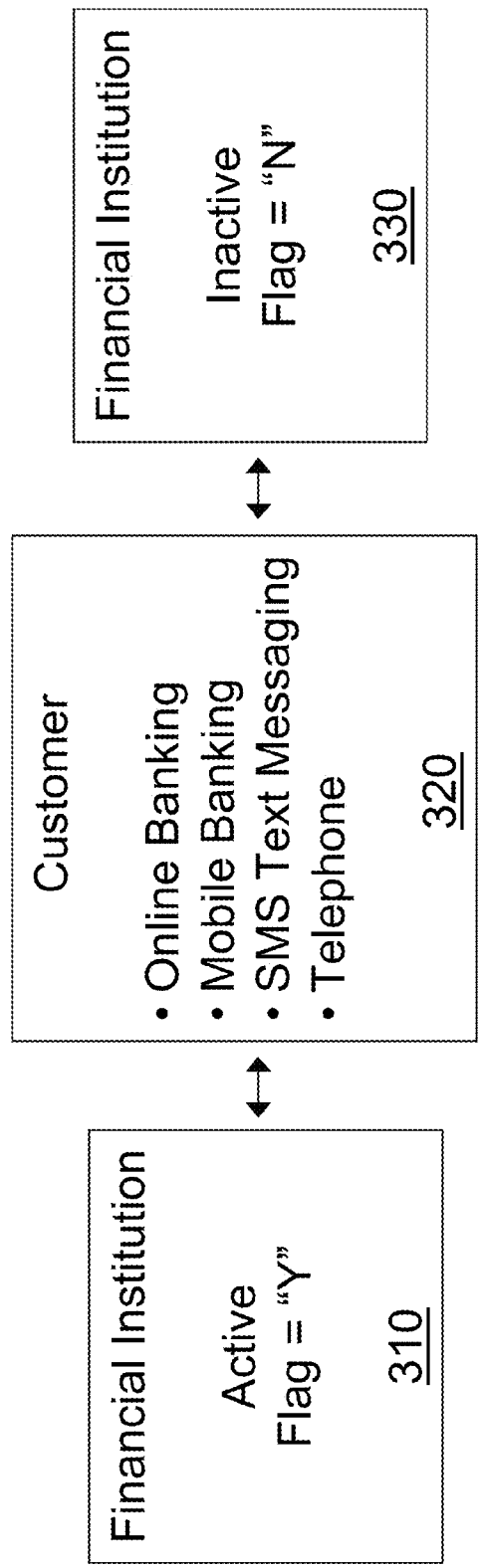
FIG. 3 shows a method for switching on and off an account according to an exemplary embodiment.

Referring to FIG. 3, the customer can request to switch an account on or off by sending a message to the financial institution. In 310, the financial institution recognizes the RFID capabilities of the account as being switched on, so the customer is able to make payments using the RFID sticker. The customer's account can have an activation flag set to "Y" or "yes" in the active or on state.

In 320, the customer chooses to switch on or off the account. The customer can choose a variety of methods for notifying the financial institution, including online banking, mobile banking, SMS text messaging, telephone, or any other method for contacting a customer service representative, such as visiting a branch location. Upon notifying the financial institution, the financial institution can change the on status to off status or the off status to on status.

In 330, the financial institution recognizes the RFID capabilities of the account as being switched off, so the customer is unable to make payments using the RFID sticker. The customer's account can have an activation flag set to "N" or "no" in the inactive or off state. While in the off state, if the financial institution receives a transaction request along with an indicator that the transaction was initiated by an RFID sticker, the financial institution will deny the transaction request.

Figure 4:
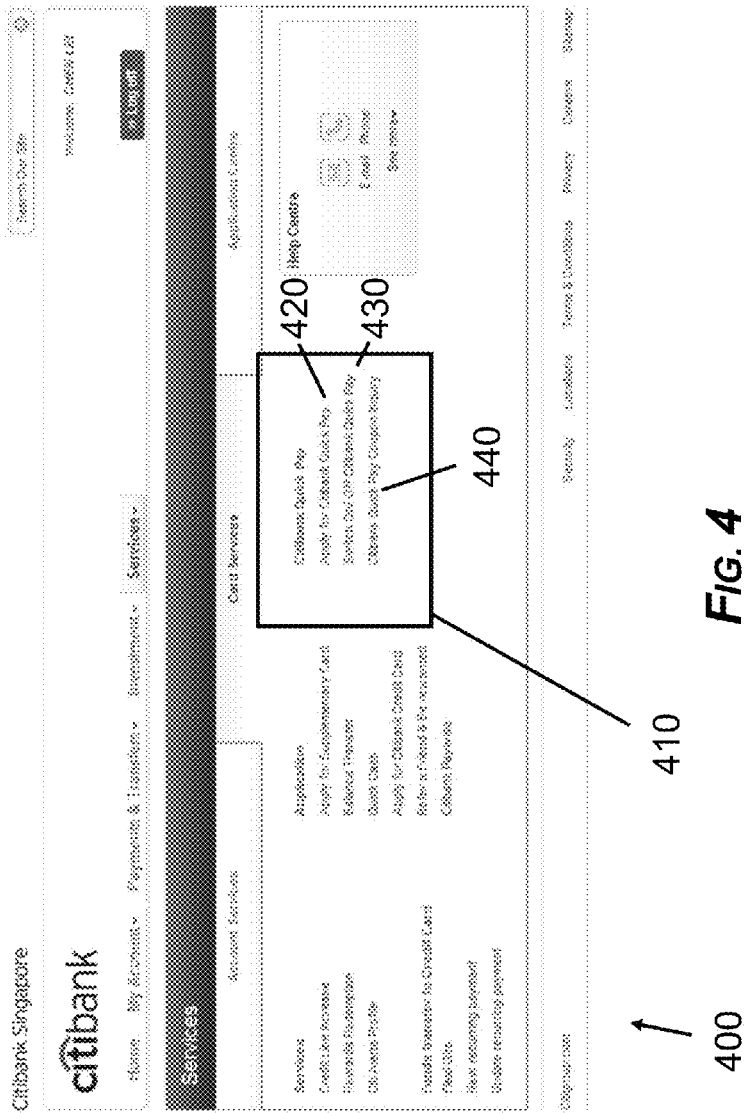
FIG. 4 shows a user interface for switching on and off an account according to an exemplary embodiment.

As a security measure and to provide flexibility, at any time, credit card members can switch on or off the ability to use the RFID sticker. In one exemplary method, the customer can use online banking services (e.g., Citibank Online, which is available at www.citibank.com.sg or www.citibank.com) to switch on or off an account. Referring to FIG. 4, a screenshot of a webpage 400 presented by a financial institution is shown where a customer has logged into online banking for the financial institution. The online banking website provides contactless payment options 410 for the customer, including "Apply for Citibank Quick Pay" link 420, "Switch On/Off Citibank Quick Pay" link 430, and "Citibank Quick Pay Coupon Inquiry" link 440. If the customer desires to switch on or off the account, the customer can click on the link 430.

Figure 5:
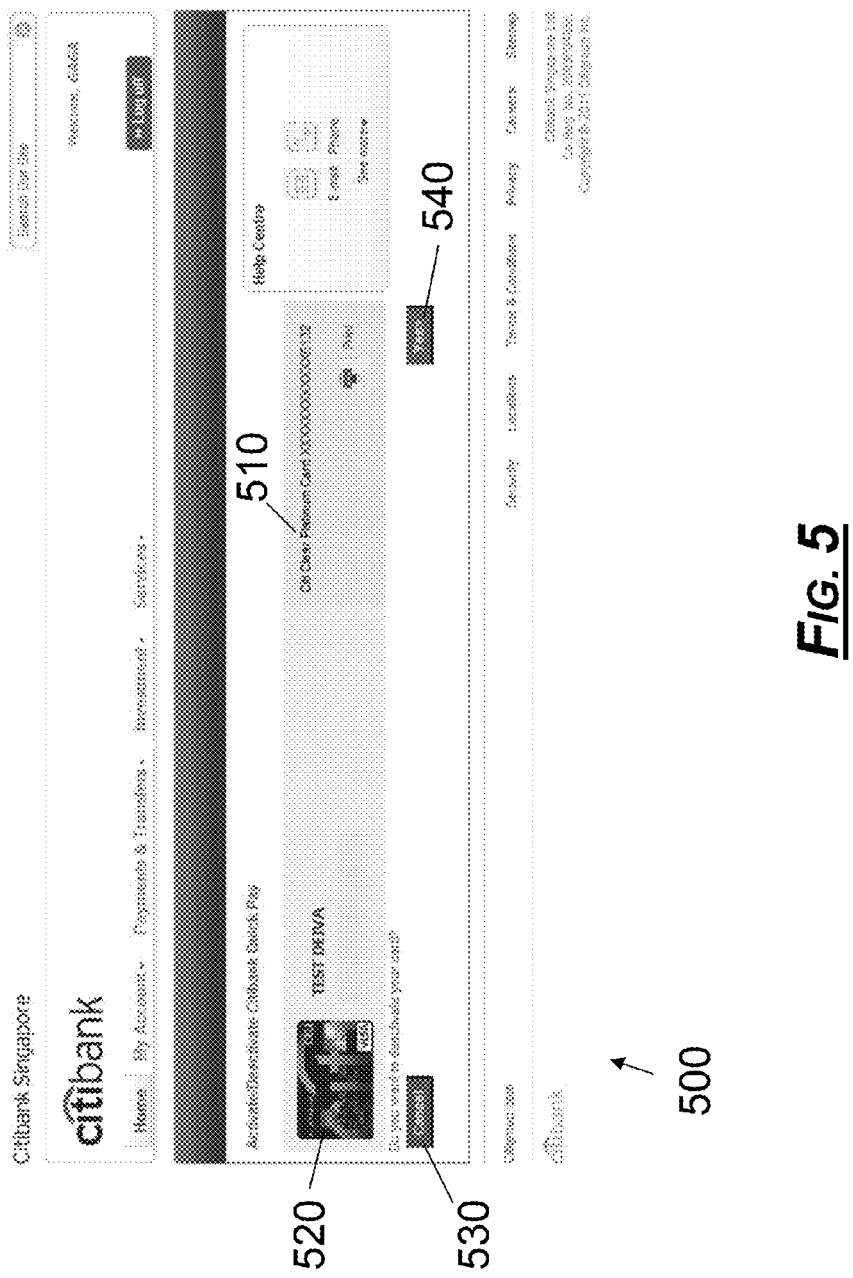
FIG. 5 shows a user interface for switching on and off an account according to an exemplary embodiment.

Referring to FIG. 5, a screenshot of a webpage 500 is shown where a customer has selected a link to switch on or off the account. The financial institution presents on the webpage 500 an identification of at least one account that is capable of being switched on (activate) or off (deactivate). In this exemplary embodiment, a credit card account 510 is shown along with an optional graphical representation 520 of the appearance of the credit card, if a conventional plastic credit card exists for that account. The customer has an option to click a link 530 to cancel the transaction or a link 540 to proceed with deactivating the card. Although this exemplary embodiment recites the deactivation of the account, it is intended that the activation of the account follows a similar process.

Figure 6:
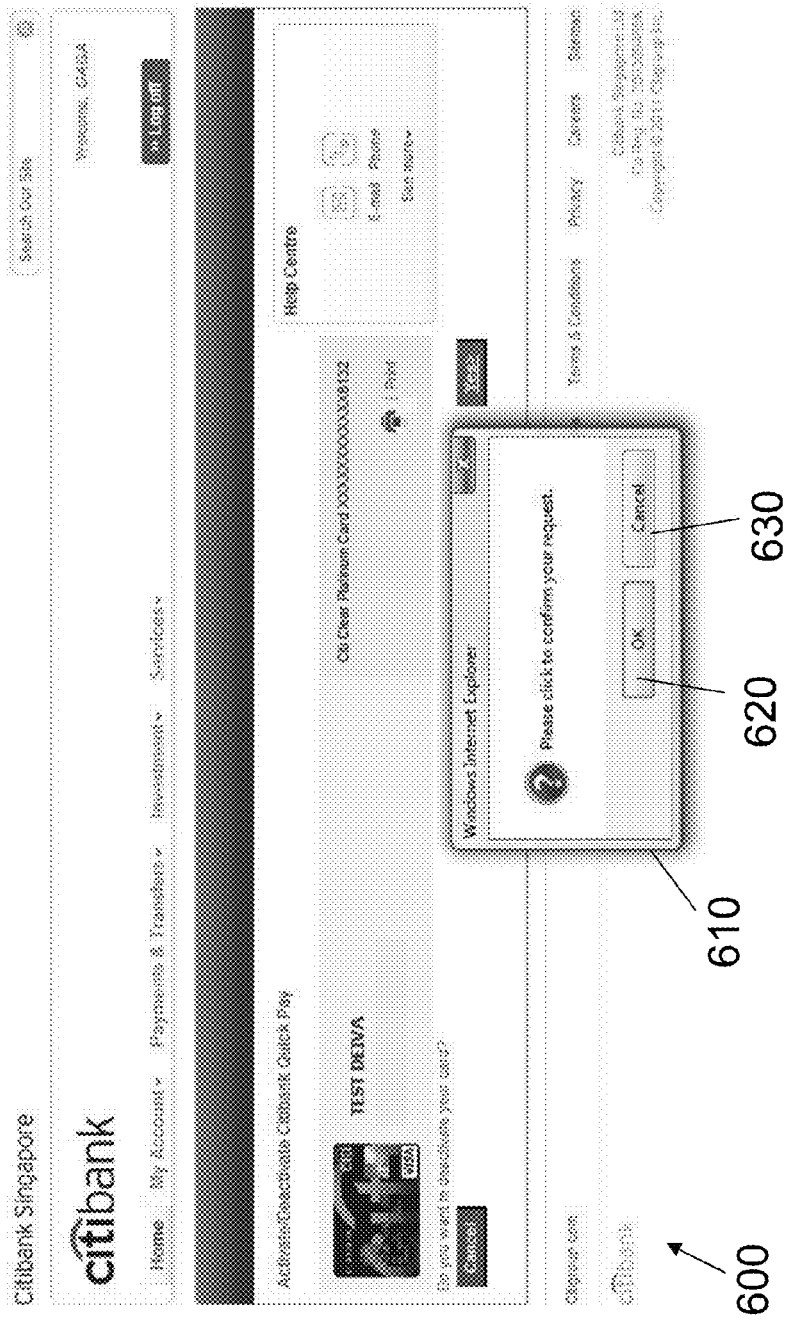
FIG. 6 shows a user interface for switching on and off an account according to an exemplary embodiment.

Referring to FIG. 6, a screenshot of a webpage 600 is shown where a customer has selected a link to proceed with switching off or deactivating (or alternatively activating) an account. The financial institution presents a confirmation window 610 that allows the customer to confirm whether to proceed by selecting a link 620 or to cancel by clicking a link 630. Upon the selection of link 620 to proceed, the financial institution will switch off or deactivate (or alternatively activate) the account.

Figure 7:
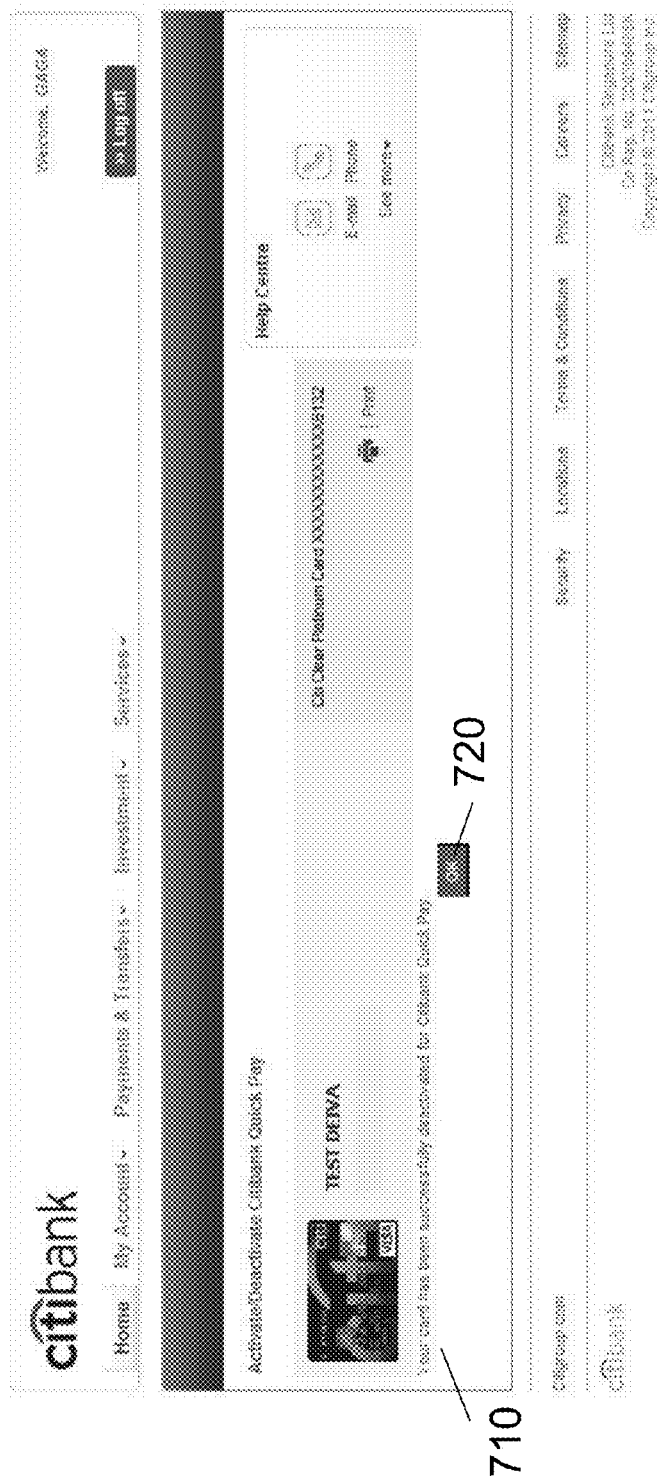
FIG. 7 shows a user interface for switching on and off an account according to an exemplary embodiment.

Referring to FIG. 7, a screenshot of a webpage 700 is shown where a customer has selected a link to confirm the deactivation (or activation) of an account. The webpage 700 confirms in a message 710 that "Your card has been successfully deactivated for Citibank Quick Pay." The customer can click on a link 720 to proceed with other online banking services or log off online banking.

Figure 8:
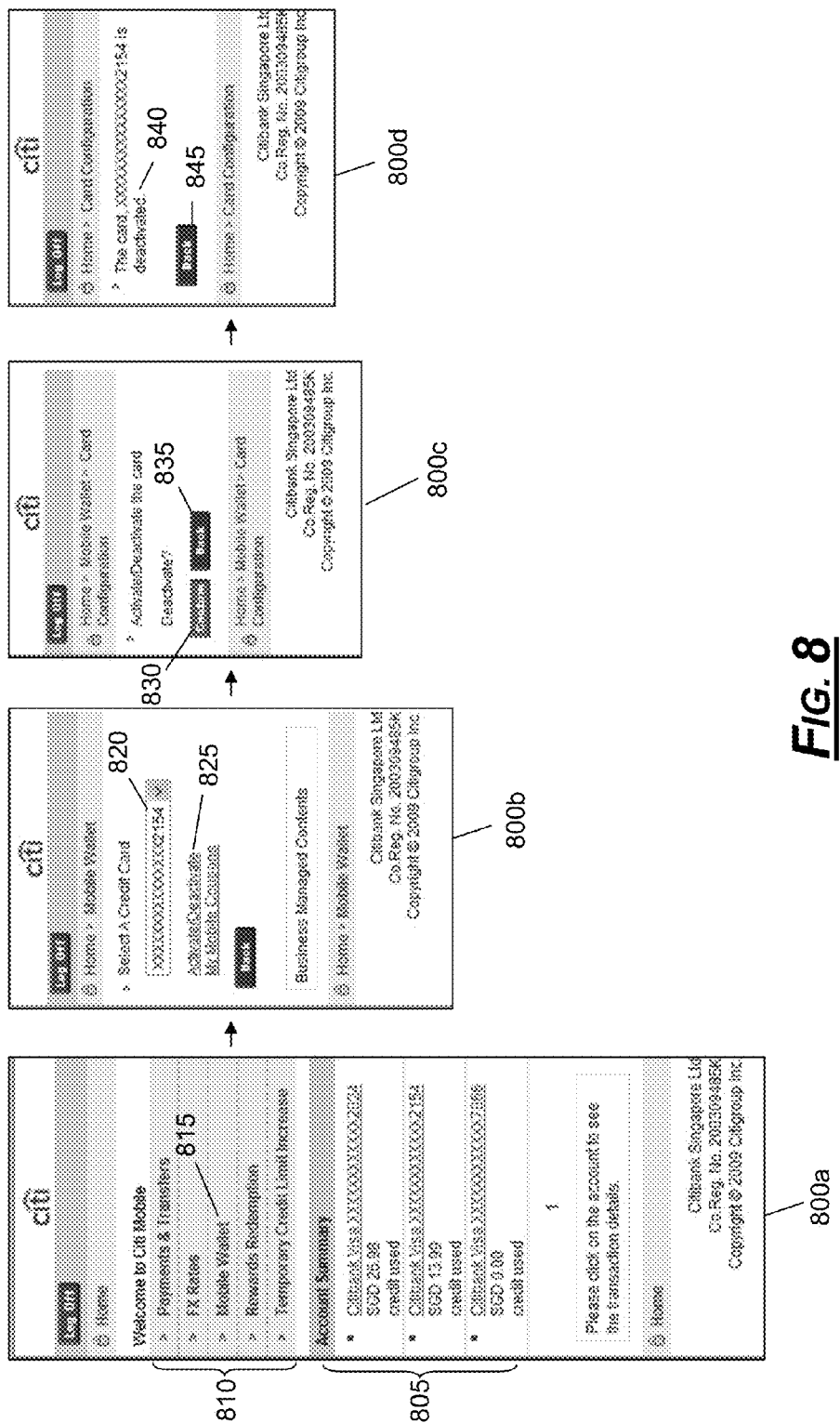
FIG. 8 shows a user interface on a mobile device for switching on and off an account according to an exemplary embodiment.

The customer can switch on or off the account using a mobile banking platform. The use of the mobile banking platform may require that the customer register a mobile phone number with the financial institution. Referring to FIG. 8, a sequence of screenshots of a user interface 800a, 800b, 800c, 800d of a mobile device is shown. The mobile device can be a mobile phone, a smart phone, a tablet computer, a personal data assistant, or any other mobile device. As shown in user interface 800a, the customer logs into a mobile banking application ("app") installed on the mobile device, accessible through a website on the mobile device, or other interface using a cellular, Wi-Fi, or Internet connection. The user interface 800a presents to the customer an account summary 805 and mobile banking options 810, which includes a "mobile wallet" link 815. The customer can select the link 815 to activate or deactivate an account.

The user interface 800b presents to the customer an option to select a credit card or other account in a drop down menu 820. The customer also has an option to select a link 825 to "Activate/Deactivate" the account selected in drop down menu 820. The customer selects the link 825 to proceed with activation or deactivation.

The user interface 800c presents to the customer a confirmation that the customer would like to activate or deactivate the selected account. In this exemplary embodiment, the user interface 800c allows the customer to deactivate a credit card account, though it is intended that the user interface 800c can be used to activate an account. The customer can select a link 830 to confirm the deactivation (or activation) or a link 835 to go to a previous screen. Upon the selection of link 830 to confirm, the financial institution will deactivate (or activate) the account.

The user interface 800d presents a confirmation message 840 to the customer that the request has been processed and the selected account has been deactivated (or activated). The customer can click on a link 845 to proceed with other mobile banking services or go to a previous screen.

If the customer misplaces, loses, or ends service on the mobile phone or the mobile phone is stolen or damaged, then the customer should report this event to the financial institution to prevent a fraudulent activation of the account by another individual. The security of the mobile banking and SMS text messaging is limited in part to the secure handling of the mobile phone by the customer.

The customer can send an SMS text message to activate or deactivate the account. The use of SMS text messaging may require that the customer register a mobile phone number with the financial institution. To deactivate or switch off an account, the customer can send an SMS text message with the format "Off <last 4 digits of account number>" to a specified SMS number for the financial institution. To activate or switch on the account, the customer can send an SMS text message with the format "On <last 4 digits of account number>" to a specified SMS number for the financial institution. The financial institution can send a confirmation SMS text message back to the phone number listed on the account to indicate that the RFID sticker has been activated or deactivated accordingly. In one alternative, the customer can receive an SMS text message asking a security question before performing the activation or deactivation. In another alternative, the customer can send an SMS text message to the financial institution requesting the status of the account to determine whether it is currently activated or deactivated.

In one alternative embodiment, the financial institution can activate the account for a predetermined period of time to allow for a single transaction or an allotted time for shopping. For example, each account can default to a deactivated status. When a customer requests activation of the account, the account is only activated for a predetermined period of time, such as five minutes, one hour, four hours, or one day. The customer can optionally select the desired period of time for activation. Once the period of time expires, the financial institution can automatically deactivate the account. The automatic deactivation can be based upon a timestamp from the activation of the account.

The predetermined period of time can also be extended each time the customer conducts a transaction. In an instance where a customer is conducting numerous transactions and may need additional time, this feature could allow the period of time to be extended each time the customer makes a purchase using that account. Alternatively, in order to extend the time, the financial institution can send a request to the customer (e.g., via text messaging) or the customer can send a request to the financial institution (e.g., via text messaging) to confirm that the time period should be extended.

In another example, a customer can call a financial institution's customer service number and ask to activate or deactivate the account. The financial institution may require identification of the customer to verify their identity, such as one or more of a name, date of birth, account number, user name, password, address, mother's maiden name, pet's name, or information about account activity. Using the phone, the customer can activate the account, deactivate the account, or receive any additional information or instructions. The financial institution can speak to the customer using an operator or interactive voice response (e.g., an audio response unit).

The customer sends the instructions via one of the channels described above or another communication channel to the financial institution to activate or deactivate the account. The customer is not limited to the use of only one channel. In some embodiments, the customer can activate the account with one channel and deactivate the account with a different channel. The financial institution updates the account record to indicate that the account can or cannot be used for processing a transaction. When a merchant submits the payment for processing, if the account is deactivated, then the financial institution denies the transaction request. If the account is activated, then the financial institution approves the transaction request. In these exemplary embodiments, the activation and deactivation occurs on the financial institution's processing to prevent the use of unauthorized RFID sticker use and does not physically turn on or off the RFID sticker or the account associated with the RFID sticker.

Connectivity and security features include a function for switching on and switching off the ability to use the RFID sticker to complete a transaction. Extra security features include Loss Card Liability, DDA compliance, and the requirement of a signature for transactions above a predetermined amount (e.g., $30 or SGD100). If a customer desires to conduct a transaction above the threshold, the customer would have to use a conventional credit card or alternative payment means. Below the threshold, the customer can use the contactless RFID sticker and a signature is not required. The financial institution can also monitor transaction outlier trends and alert the customer if fraud is suspected (e.g., numerous small transactions of the same amount being charged within a certain time period). Described herein, the customer can choose to switch on or off the RFID sticker capability in real-time using internet-based banking, mobile banking, 2-way SMS text messaging, or other communications methods.

Alerts can be triggered when transactions are processed above a pre-determined threshold. For example, the financial institution can send an SMS alert to a customer that a transaction has been made above the threshold. All transactions using the RFID sticker may be required to undergo online authorization using the customer's available credit limit. Customers can be limited to a liability of a predetermined amount (e.g., $30 or SGD100) for fraudulent transactions using the RFID sticker (after the financial institution is notified of the card loss).

In implementing these systems and methods to be performed by a suitably programmed computer, it is intended that the computers described herein have a processor and a computer readable medium, wherein the computer readable medium has program code. The program code can be made of one or more modules that carry out instructions for implementing the systems and methods herein. The processor can execute the instructions as programmed in the modules of the program code. The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

The systems and methods described herein as software can be executed on at least one computer or server, though it is understood that they can be configured in other ways and retain its functionality. The above-described technology can be implemented on known devices such as a personal computer, a special purpose computer, cellular telephone, personal digital assistant (PDA), a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method for preventing processing of unauthorized transactions using an RFID mechanism, the method comprising:
   receiving, by a computer of a financial institution, a first request from a customer to activate a credit account of the customer for use with the RFID mechanism, wherein the RFID mechanism is always in a state of transmitting data, and wherein the first request is submitted via a website of the financial institution, a text message to the financial institution, a mobile banking application of the financial institution, or a phone call to the financial institution;
   after receiving the first request, activating, by a computer of the financial institution, the credit account of the customer allowing processing of at least one transaction subsequent to the first request that is made by the customer using the RFID mechanism;
   after activating the credit card account of the customer, receiving, by a computer of the financial institution, a request from a merchant to authorize the at least one transaction that is made by the customer using the RFID mechanism by linking the use of the RFID mechanism to the credit account of the customer for at least one transaction subsequent to the first request;
   transmitting, by a computer of the financial institution, an authorization for the at least one transaction to the merchant;
   completing the at least one authorized transaction;
   after completing the at least one authorized transaction, receiving, by a computer of the financial institution, a second request from the customer to deactivate the credit account of the customer from use of the RFID mechanism for any subsequent transactions made using the RFID mechanism after the second request,
   wherein the second request is submitted via the website of the financial institution, a text message to the financial institution, the mobile banking application of the financial institution, or a phone call to the financial institution; and
   after receiving the second request, deactivating, by a computer of the financial institution, the credit account of the customer by unlinking the use of the RFID mechanism to the credit account of the customer for any subsequent transactions made using the RFID mechanism after the second request, wherein the credit account of the customer remains available for use by the customer using any payment mechanism other than the RFID mechanism after deactivating the credit account of the customer.

2. The method according to claim 1, wherein receiving the first request further comprises:
   verifying an identity of the customer;
   receiving a selection of a link by the customer activating the credit account; and
   updating a record in a database of the financial institution that the credit account is in an active state.

3. The method according to claim 1, further comprising:
   determining whether the credit account is in an active state based on a record in a database of the financial institution;
   authorizing the at least one transaction if the credit account is in an active state; and
   declining the at least one transaction if the credit account is in a deactive state.

4. The method according to claim 1, wherein the website used to submit the first request is an online banking website of the financial institution.

5. The method according to claim 1, wherein the first request is received from a mobile device of the customer.

6. The method according to claim 1, wherein the first request is submitted via the text message to the financial institution, the method further comprising:
   receiving the text message from a mobile phone number registered with the financial institution for the customer, wherein the text message comprises an instruction to activate the credit account.

7. The method according to claim 1, wherein receiving the second request further comprises:
   verifying an identity of the customer;
   receiving a selection of a link by the customer deactivating the credit account; and
   updating a record in a database of the financial institution that the credit account is in a deactive state.

8. The method according to claim 1, wherein the second request is submitted via the text message to the financial institution, the method further comprising:
   receiving the text message from a mobile phone number registered with the financial institution for the customer, wherein the text message comprises an instruction to deactivate the credit account.

9. The method according to claim 1, wherein the authorization further comprises determining whether a transaction amount exceeds a predetermined threshold, and whether the credit account is in an active state or in a deactive state.

* * * * *